United States Patent Office 2,881,219
Patented Apr. 7, 1959

2,881,219

ALKYLATION OF ARYLOLS

Ralph B. Thompson, Hinsdale, Ill., assignor to Universal Oil Products Company, Des Plaines, Ill., a corporation of Delaware No Drawing. Application May 15, 1956
Serial No. 584,883

8 Claims. (Cl. 260—613)

This invention relates to a process for alkylating arylols, and more particularly to a process for alkylating polycyclic aromatic compounds containing at least one hydroxyl substituent.

It is an object of this invention to prepare alkyl substituted arylols.

Another object of this invention is to prepare alkylated arylols which are useful as additives to prevent oxidation in hydrocarbon mixtures.

One embodiment of this invention resides in a process for the alkylation of an arylol which comprises alkylating an arylol with an alkylating agent in the presence of an acid acting alkylation catalyst comprising a mixture of an inorganic acid and an organic acid, and recovering the resultant alkylated arylol.

A specific object of the invention is found in a process for the alkylation of an arylol which comprises alkylating an arylol with an alkylating agent in the presence of an acid acting alkylation catalyst comprising a mixture of a phosphoric acid and acetic acid, and recovering the resultant alkylated arylol.

A more specific embodiment of the invention resides in a process for the alkylation of a naphthol which comprises alkylating 1-naphthol with tert-butyl alcohol in the presence of an acid acting alkylation catalyst comprising a mixture of a phosphoric acid and acetic acid, and recovering the resultant 2-tert-butyl-1-napthol.

Other objects and embodiments referring to alternative arylols and to alternative alkylating agents will be found in the following further detailed description of the invention.

It has now been discovered that certain arylols, particularly polycyclic aromatic compounds containing at least one hydroxyl group may be alkylated by alkylating said arylol with an alkylating agent in the presence of an acid acting alkylation catalyst which comprises a mixture of a phosphoric acid and a low molecular weight organic acid. This is particularly true in alkylations involving polycyclic aromatic compounds containing a hydroxyl group. Heretofore these compounds could not be readily alkylated due to the relative insolubility of the hydroxy substituted polycyclic aromatic compounds in the phosphoric acid catalyst. However, the addition of the low molecular weight organic acid to the phosphoric acid allows the alkylation of the aforesaid hydroxy substituted polycyclic aromatic compounds to proceed without difficulty. The alkylated arylols thus produced are useful in preventing oxidative deterioration of hydrocarbon products such as petroleum fractions including oils, greases, gasolines, etc.; as well as animal fats and oils such as lard; and vegetable oils, etc.

The term "arylol" when used in the process of this invention is taken to mean an alkylatable aromatic compound containing one or more hydroxyl groups and at least one replaceable hydrogen atom. Examples of these compounds include phenol, 1,2-dihydroxy benzene (catechol), 1,3-dihydroxybenzene (resorcinol), 1,4-dihydroxy benzene (hydroquinone), 1,2,3-trihydroxybenzene (pyrogallol), 1,2,4-trihydroxybenzene (hydroxy-hydroquinone), 1,3,5-trihydroxybenzene (phloroglucinol), 1-hydroxynaphthylene (1-naphthol), 2-hydroxynaphthalene (2-naphthol), 1,2-dihydroxynaphthalene (1,2-naphthdiol), 1,3-dihydroxynaphthalene (1,3-naphthdiol), 1,4-dihydroxynaphthalene (1,4-naphthdiol), 1,5-dihydroxynaphthalene (1.5-naphthdiol), 1,6-dihydroxynaphthalene, 1,7 - dihydroxynaphthalene, 1,8 - dihydroxynaphthalene, 2,3 - dihydroxynaphthalene, 2,6 - dihydroxynaphthalene, 2,7-dihydroxynaphthalene, 1-hydroxyanthracene, 2-hydroxyanthracene, etc., 1,2-dihydroxyanthracene, 1,3-dihydroxyanthracene, 1,4-dihydroxyanthracene, 1,5-dihydroxyanthracene, 1,6 - dihydroxyanthrecene, 1,7 - dihydroxyanthracene, 1,8 - dihydroxyanthracene, 1,9 - dihydroxyanthracene; 1,10-dihydroxyanthracene, etc., 1-hydroxyphenanthrene, 2-hydroxyphenanthrene, etc., 1,2-dihydroxyphenanthrene, 1,3 - dihydroxyphenanthrene, 1,4-dihydroxyphenanthrene, 1,5-dihydroxyphenanthrene, 1,6-dihydroxyphenanthrene, 1,7-dihydroxyphenanthrene, 1,8-dihydroxyphenanthrene, etc., 1-hydroxychrysene, 2-hydroxychrysene, etc., 1,2-dihydroxychrysene, 1,3-dihydroxychrysene, 1,4-dihydroxychrysene, 1,5-dihydroxychrysene, 1,6-dihydroxychrysene, 1,7-dihydroxychrysene, 1,8-dihydroxychrysene, etc., 1-hydroxypyrene, 2-hydroxypyrene, etc., 1,2-dihydroxypyrene, 1,3-dihydroxypyrene, 1,4-dihydroxypyrene, 1,5-dihydroxypyrene, 1,6-dihydroxypyrene, 1,7-dihydroxypyrene, 1,8-dihydroxypyrene, etc.

It is also contemplated within the scope of this invention that arylol compounds containing additional substituents such as alkoxy groups may also be alkylated. Examples of these compounds include o-methoxyphenol, m-methoxyphenol, p-methoxyphenol, o-ethoxyphenol, m - ethoxyphenol, p - ethoxyphenol, o - methoxynapthol, m-methoxynaphthol, 4-methoxy-1-naphthol, 5-methoxy-1-naphthol, 6-methoxy-1-naphthol, o-ethoxynaphthol, m-ethoxynapthol, 4-ethoxy-1-naphthol, 5-ethoxy-1-naphthol, 6-ethoxy-1-naphthol, 2-methoxy-1,5-dihydroxynaphthalene (2-methoxy-1,5-naphthdiol), 3-methoxy-1,5-naphthdiol, 4-methoxy-1,5-naphthdiol, 6-methoxy-1,5-naphthdiol, 2-ethoxy-1,5-naphthdiol, 3-ethoxy-1,5-naphthdiol, 4-ethoxy-1,5-naphthdiol, 6-ethoxy-1,5-napthdiol, etc. It is to be understood that the above enumerated arylols are only representatives of the class of compounds which may be alkylated in the process of this invention and that other compounds falling within the definition hereinbefore stated may be used, although not necessarily with equivalent results.

The alkylating agents which may be used to alkylate the aforesaid arylols may include alcohols, olefins, halides, ethers, esters, etc. Examples of these compounds include alcohols such as propyl alcohol, isopropyl alcohol, n-butyl alcohol, isobutyl alcohol, tert-butyl alcohol, amyl alcohol, hexyl alcohol, heptyl alcohol, octyl alcohol, etc.; olefins such as ethene, propene, 1-butene, 2-methyl-1-butene, 3-methyl-1-butene, 2-butene, 2-methyl-2-butene, 1-pentene, 2-methyl-1-pentene, 3-methyl-1-pentene, 4-methyl-1-pentene, 2-pentene, 2-methyl-2-pentene, 3-methyl-2-pentene, 4-methyl-2-pentene, 3-pentene, 2-methyl-3-pentene, 1-hexene, 2-hexene, 3-hexene, etc.; halides such as methyl chloride, ethyl chloride, n-propyl chloride, isopropyl chloride, n-butyl chloride, isobutyl chloride, tert-butyl chloride, n-amyl chloride, methyl bromide, ethyl bromide, propyl bromide, isopropyl bromide, butyl bromide, isobutyl bromide, tert-butyl bromide, amyl bromide, methyl fluoride, ethyl fluoride, propyl fluoride, isopropyl fluoride, butyl fluoride, isobutyl fluoride, tert-butyl fluoride, amyl fluoride, methyl iodide, ethyl iodide, propyl iodide, isopropyl iodide, butyl iodide, isobutyl iodide, tert-butyl iodide, amyl iodide, etc.; ethers such as methyl ether, ethyl ether, propyl ether, methylethyl ether, methylpropyl ether, ethylpropyl ether, butyl ether, methylbutyl ether, ethylbutyl ether, propylbutyl ether, etc.; esters such as methyl acetate, methyl propionate, methyl butyrate, methyl valerate, methyl caproate, methyl heptonate, methyl caprylate, methyl pelargonate, methyl caprate, ethyl acetate, ethyl propionate, ethyl butyrate, ethyl valerate, ethyl caproate, ethyl heptonate, ethyl caprylate, ethyl pelargonate, ethyl caprate, propyl acetate, propyl propionate, propyl butyrate, propyl valerate, propyl caproate, propyl heptonate, propyl caprylate, propyl pelargonate, propyl caprate, etc. It is also to be understood that these above enumerated alkylating agents are only representatives of the class of compounds which may be used in this invention, and that said invention is not necessarily limited thereto.

As hereinbefore indicated the alkylation of the arylols is effected by condensing said alkylating agent and said arylols in the presence of an acid acting alkylation catalyst which comprises a mixture of an inorganic acid and an organic acid. The preferred inorganic acid of the present process is concentrated orthophosphoric acid. The aforementioned phosphoric acid is admixed with a low molecular weight organic acid containing from one to five carbon atoms which may act as a solvent for the arylol and the alkylating agent, examples of said low molecular weight organic acids which may be used include formic acid, acetic acid, propionic acid, butyric acid and valeric acid. The amount of the molecular weight organic acid used in the process of this invention will depend upon the particular arylol undergoing alkylation, the usual amount of organic acid being present in an amount of from about 10% to about 100% by weight of the phosphoric acid.

The alkylation of the arylol by the aforesaid alkylating agents is carried out at slightly elevated temperatures ranging from about 50° C. to about 150° C. and at a pressure sufficient to maintain the reactants and catalyst in a substantially liquid phase.

The process of this invention may be effected in any suitable manner and may comprise either a batch or a continuous type operation. For example, when a batch type operation is used, a quantity of the starting materials comprising an arylol, an alkylating agent, a phosphoric acid and a low molecular weight organic acid are placed in an alkylation vessel provided with heating and stirring means. The reaction mixture is then heated to the desired temperature and maintained thereat for a predetermined period of time after which the vessel and contents thereof are cooled to room temperature. The reaction product is then separated from any unreacted starting materials by conventional means. For example, the reaction product may be extracted with ether and the ether solution further extracted with a dilute alkali to remove the unreacted starting materials. The reaction product which is insoluble in the dilute alkali may then be further extracted with a stronger alkaline solution followed by fractional distillation under reduced pressure and recrystallization to obtain the purified product.

Another process comprises the continuous type operation. In this type of operation the starting materials comprising the arylol and the alkylating agent are continuously charged through separate means to a reaction vessel maintained at the proper operating conditions of temperature and pressure. The phosphoric acid and low molecular weight organic acid which comprise the acid acting alkylation catalyst are also continuously charged to said vessel through separate means. If so desired, the two acids may be admixed prior to introduction into said vessel and charged thereto in a single stream. Yet another modification of the present process is the admixture of the arylol and low molecular weight organic acid prior to introduction into said vessel, after which the arylol dissolved in the acid is charged thereto in a single stream. The alkylated arylol is continuously withdrawn from the reactor and recovered by conventional means hereinbefore set forth, while the starting materials which are separated therefrom may be recharged to the reactor as a portion of the feed stock.

The following examples are given to illustrate the process of the present invention which, however, are not intended to limit the generally broad scope of the present invention in strict accordance therewith.

*Example I*

17.4 g. of 5-methoxy-1-naphthol, 7.5 g. of tert-butyl alcohol and 30 g. of glacial acetic acid were placed in a condensation flask provided with heating and stirring means. 75 g. of 85% phosphoric acid was slowly added to the mixture with continual stirring. The temperature was maintained in the range of from about 65° to 70° C. for approximately three hours, said mixture being continuously stirred during this period. At the end of this time the flask and contents thereof were cooled to room temperature and the reaction product poured into water. The water solution was extracted with ether and the resulting ether solution extracted with 10% sodium hydroxide to remove the unreacted starting material comprising 5-methoxy-1-naphthol. The remainder of the solution was extracted with Claisen solution (25% KOH, 25% $H_2O$ and 50% $CH_3OH$) to remove the potassium salt of the desired product, namely, 2-tert-butyl-5-methoxy-1-naphthol. The latter compound after neutralization was purified by distillation under reduced pressure and recrystallized from petroleum ether.

*Example II*

To show how a low molecular weight organic acid, when combined with a phosphoric acid catalyst, effects the alkylation of a polycyclic aromatic compound containing a hydroxyl group, an experiment was run omitting the organic acid as a part of the catalyst.

A mixture of 17.4 g. of 5-methoxy-1-naphthol and 50 g. of 85% phosphoric acid was placed in a condensation flask provided with heating and stirring means. 7.5 g. of tert-butyl alcohol was slowly added with continual stirring, while maintaining the temperature of the mixture at 60° C. 50 g. of additional phosphoric acid was added after which the mixture was continually stirred at 60° C. for 4 hours. At the end of this time the reaction product was poured into water and the water solution extracted with ether. The ether solution was then extracted with 10% sodium hydroxide from which solution a small amount of diisobutylene was isolated. The fraction of the reaction mixture which was soluble in the 10% sodium hydroxide constituted 5-methoxy-1-naphthol, there being only a trace of material present which could constitute the alkylated product of the starting material.

*Example III*

A mixture of 1,5-dihydroxynaphthalene (1,5-naphthdiol), tert-butyl alcohol and acetic acid is placed in a condensation flask provided with heating and stirring means. Phosphoric acid is gradually added to said mixture while the mixture is continually stirred. The flask is heated to a temperature of approximately 70° C. and maintained thereat for about three hours while stirring of the mixture is continued. At the end of this time the flask and contents thereof are cooled to room temperature. The reaction mixture is washed with water and extracted with ether. The ether solution is again extracted with 10% sodium hydroxide to remove unreacted starting materials after which the product insoluble in said alkali is extracted in Claisen solution (25% KOH, 25% $H_2O$ and 50% $CH_3OH$). The soluble portion of this solution comprising the potassium salt of the desired product is neutralized and distilled under reduced pressure, the cut comprising 2,6-di(tert-butyl)-1,5-naphthdiol being separated out and recrystallized from petroleum ether.

*Example IV*

To a mixture of 1-naphthol, tert-butyl chloride and acetic acid in a condensation flask is slowly added 85% phosphoric acid while said mixture is continuously stirred. The temperature of the reaction vessel is maintained at approximately 70° C. for about three hours after which the flask and contents thereof are cooled to room temperature. The reaction mixture is washed with water and extracted with either. The ether solution is then extracted with 10% sodium hydroxide and the alkali insoluble portion subjected to further extraction with Claisen solution. The soluble portion of the latter solution comprising the potassium salt of the desired product is neutralized and subjected to fractional distillation, the cut comprising 2-tert-butyl-1-naphthol is then separated and recrystallized from petroleum ether.

I claim as my invention:

1. A process for the alkylation of a naphthol containing from 1 to 2 hydroxyl groups and which is relatively insoluble in liquid phosphoric acid catalyst which comprises alkylating said naphthol in the presence of said catalyst and an organic acid selected from the group consisting of formic, acetic, propionic, butyric and valeric acids in an amount of from about 10% to about 100% by weight of the phosphoric acid, and recovering the resultant alkylated naphthol.

2. A process for the alkylation of a naphthol containing from 1 to 2 hydroxyl groups and which is relatively insoluble in orthophosphoric acid which comprises alkylating said naphthol in the presence of approximately 85% orthophosphoric acid and an organic acid selected from the group consisting of formic, acetic, propionic, butyric and valeric acids in an amount of from about 10% to about 100% by weight of the phosphoric acid, and recovering the resultant alkylated naphthol.

3. A process for the alkylation of a naphthol containing from 1 to 2 hydroxyl groups and which is relatively insoluble in liquid phosphoric acid catalyst which comprises alkylating said naphthol in the presence of said catalyst and acetic acid in an amount of from about 10% to about 100% by weight of the phosphoric acid, and recovering the resultant alkylated naphthol.

4. A process for the alkylation of a naphthol containing from 1 to 2 hydroxyl groups and which is relatively insoluble in liquid phosphoric acid catalyst which comprises alkylating said naphthol with tert-butyl alcohol in the presence of said catalyst and acetic acid in an amount of from about 10% to about 100% by weight of the phosphoric acid, and recovering the resultant alkylated naphthol.

5. The process of claim 4 further characterized in that said naphthol is 1-naphthol.

6. The process of claim 4 further characterized in that said naphthol is 1,5-naphthdiol.

7. The process of claim 4 further characterized in that said naphthol is 5-methoxy-1-naphthol.

8. The process of claim 4 further characterized in that said naphthol is 5-ethoxy-1-naphthol.

References Cited in the file of this patent

UNITED STATES PATENTS

| | | |
|---|---|---|
| 2,018,065 | Ipatieff | Oct. 22, 1935 |
| 2,154,192 | Zinke | Apr. 11, 1939 |
| 2,415,069 | Arvin et al. | Feb. 4, 1947 |
| 2,470,902 | Rosenwald | May 24, 1949 |
| 2,616,931 | Rosenwald | Nov. 4, 1952 |

OTHER REFERENCES

Conant et al.: Jour. Amer. Chem. Soc., vol. 50 (1928), pp. 2305–2311.

Chichibabin: Chem. Abstracts, vol. 28 (1934), p. 3722.

Price: "Organic Reactions," vol. III (1946), p. 68.

Audrieth et al.: Non-Aqueous Solvents (1953), pp. 12 and 149.